United States Patent
Schmidt et al.

(10) Patent No.: US 8,909,981 B2
(45) Date of Patent: Dec. 9, 2014

(54) CONTROL SYSTEM SOFTWARE EXECUTION DURING FAULT DETECTION

(75) Inventors: Jeffery S. Schmidt, Rockton, IL (US); Kamaraj Thangavelu, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 564 days.

(21) Appl. No.: 13/165,251

(22) Filed: Jun. 21, 2011

(65) Prior Publication Data
US 2012/0331339 A1  Dec. 27, 2012

(51) Int. Cl.
*G06F 11/00* (2006.01)
*G05B 9/02* (2006.01)

(52) U.S. Cl.
CPC ........................ *G05B 9/02* (2013.01)
USPC ............................. 714/6.1; 714/37

(58) Field of Classification Search
None
See application file for complete search history.

(56) References Cited

U.S. PATENT DOCUMENTS

| | | | |
|---|---|---|---|
| 4,360,915 A | 11/1982 | Sindelar | |
| 4,805,097 A * | 2/1989 | De Sanna | 711/206 |
| 5,056,095 A * | 10/1991 | Horiguchi et al. | 714/765 |
| 5,898,711 A | 4/1999 | Buer | |
| 5,907,671 A * | 5/1999 | Chen et al. | 714/6.24 |
| 6,122,575 A | 9/2000 | Schmidt et al. | |
| 6,901,532 B2 | 5/2005 | DeRuiter et al. | |
| 7,325,155 B2 * | 1/2008 | Trantham et al. | 714/6.24 |
| 7,334,159 B1 * | 2/2008 | Callaghan | 714/30 |
| 7,594,135 B2 * | 9/2009 | Gonzalez et al. | 714/6.1 |
| 7,796,366 B2 | 9/2010 | Kilroy et al. | |
| 7,865,805 B1 * | 1/2011 | Gallagher et al. | 714/773 |
| 2006/0069941 A1 | 3/2006 | Trantham et al. | |
| 2006/0075281 A1 | 4/2006 | Kimmel et al. | |
| 2006/0107264 A1 | 5/2006 | Schmidt et al. | |
| 2007/0133135 A1 | 6/2007 | Kilroy et al. | |
| 2008/0262729 A1 | 10/2008 | Bacon et al. | |
| 2011/0083041 A1 * | 4/2011 | Rohleder et al. | 714/15 |

* cited by examiner

*Primary Examiner* — Michael Maskulinski
(74) *Attorney, Agent, or Firm* — Carlson, Gaskey & Olds, P.C.

(57) ABSTRACT

An example method for uninterrupted execution of control software in an aircraft control system includes creating a plurality of static data copies. A first parity bit is determined for each of the plurality of static data copies. A second parity bit is determined for a first static data copy. A parity fault is detected in the first static data copy if the first parity bit does not match the second parity bit. The system switches to read a second static data copy in response to detecting a parity fault in the first static data copy.

23 Claims, 6 Drawing Sheets

CONTROL SYSTEM SOFTWARE EXECUTION DURING FAULT DETECTION

BACKGROUND

This disclosure is directed towards a control system for use with avionic hardware, and more specifically to uninterrupted execution of control software in the control system when faults are detected.

Control systems used with avionic hardware can be subject to single event upset (SEU) occurrences during operation. An SEU can occur when the control system is exposed to ions or electromagnetic radiation. The ions or electromagnetic radiation can cause data within a random access memory (RAM) to change, or be altered. Data may be stored as bytes of memory, each byte including 8 bits. When the control system relies on altered bytes of data, an SEU can occur because the control system is relying on a byte of data having an incorrect value.

Previously, when a fault was detected that could result in an SEU, the control software would reset the system to clear out the fault. However, resetting the system results in time delays from the system being reset and the software receiving a power up sequence to begin running the control system under normal circumstances.

SUMMARY

An example method for uninterrupted execution of control software in an aircraft control system includes creating a plurality of static data copies. A first parity bit is determined for each of the plurality of static data copies. A second parity bit is determined from reading the static data copy. A parity fault is detected in the first static data copy if the first parity bit does not match the second parity bit. The system switches to read a second static data copy in response to detecting a parity fault in the first static data copy.

An example method of data fault correction in a control system during operation in an aircraft includes reading a plurality of static data copies from a random access memory (RAM) and comparing each of the plurality of static data copies to each other. A corrupted static data copy is determined to have a parity fault indicating that least one bit does not match a corresponding bit in the remaining static data copies amongst the plurality of static data copies. The corrupted static data copy is overwritten with a second data copy to remove the parity fault. Each of the plurality of static data copies is written into the RAM.

An example aircraft control system for continual execution of control software during fault detection includes a random access memory (RAM) configured to store a plurality of static data copies and a processor configured to access a current static data copy for use during operation. The system also includes a parity generator configured to generate a first parity bit for each of the plurality of static data copies when the processor writes data to the RAM. The first parity bit is sent to the RAM for storage with the corresponding static data copy. The parity generator is configured to generate a second parity bit for each of the plurality of static data copies when each of the plurality of static data copy is read by the processor. The system also includes a parity checker configured to compare the first parity bit and the second parity bit for each static data copy being read. The parity checker is configured to notify the processor when the first parity bit and second parity bit are not matching, thus indicating a parity fault. The processor is reconfigured to access a new static data copy from the plurality of static data copies in response to the parity fault.

These and other features of the present disclosure can be best understood from the following specification and drawings, the following of which is a brief description.

DETAILED DESCRIPTION

Figure 1:
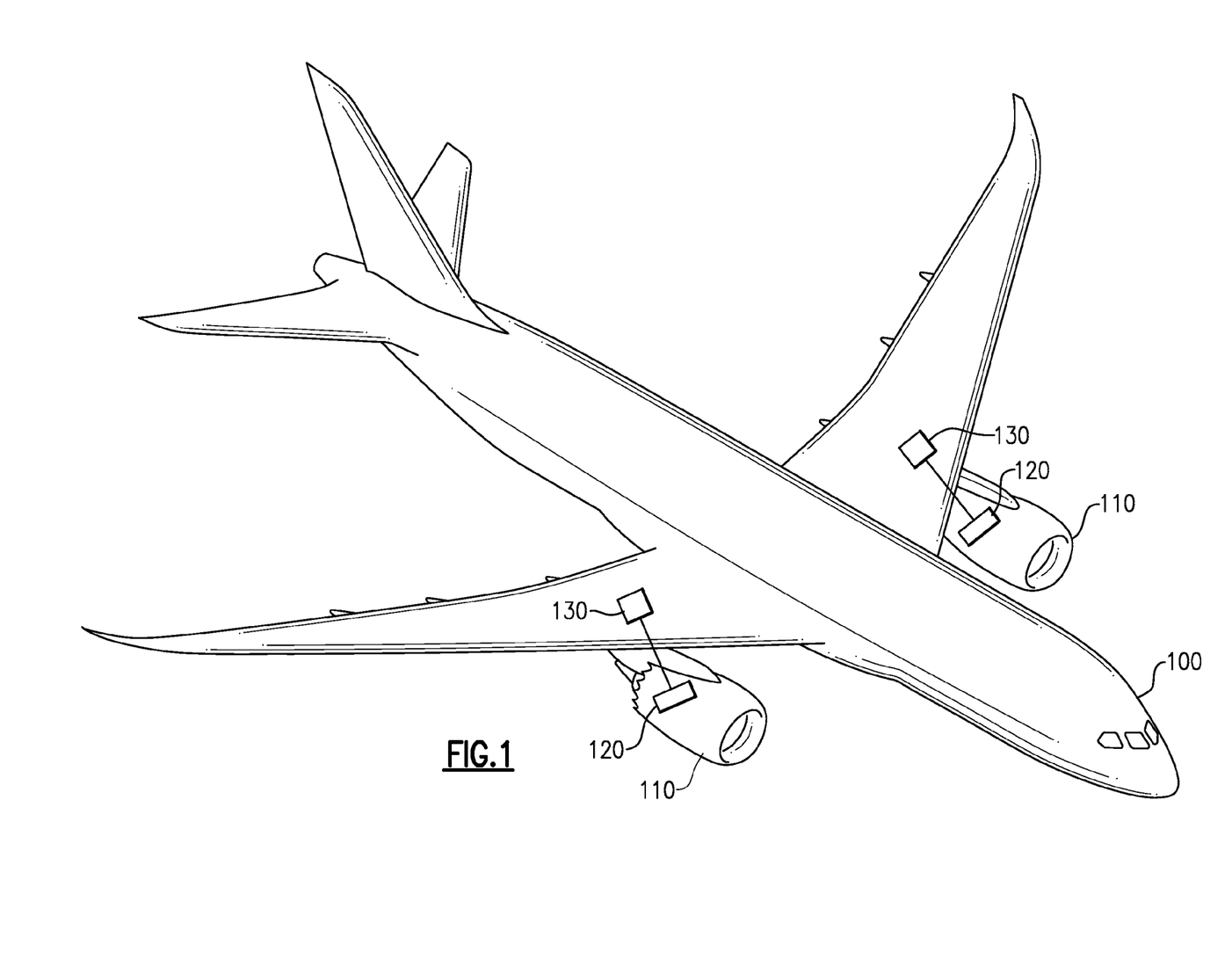
FIG. 1 schematically shows an airplane having a control system.

Referring to FIG. 1, an example airplane 100 includes gas turbine engines 110. Each of the gas turbine engines 110 drive a generator 120, shown schematically. A control system 130 communicates to control the generator 120. In this example, the control system 130 is a generator control unit. However, other control systems 130, which control various avionic hardware and systems throughout the airplane 100, are contemplated to include the method and software disclosed.

Figure 2:
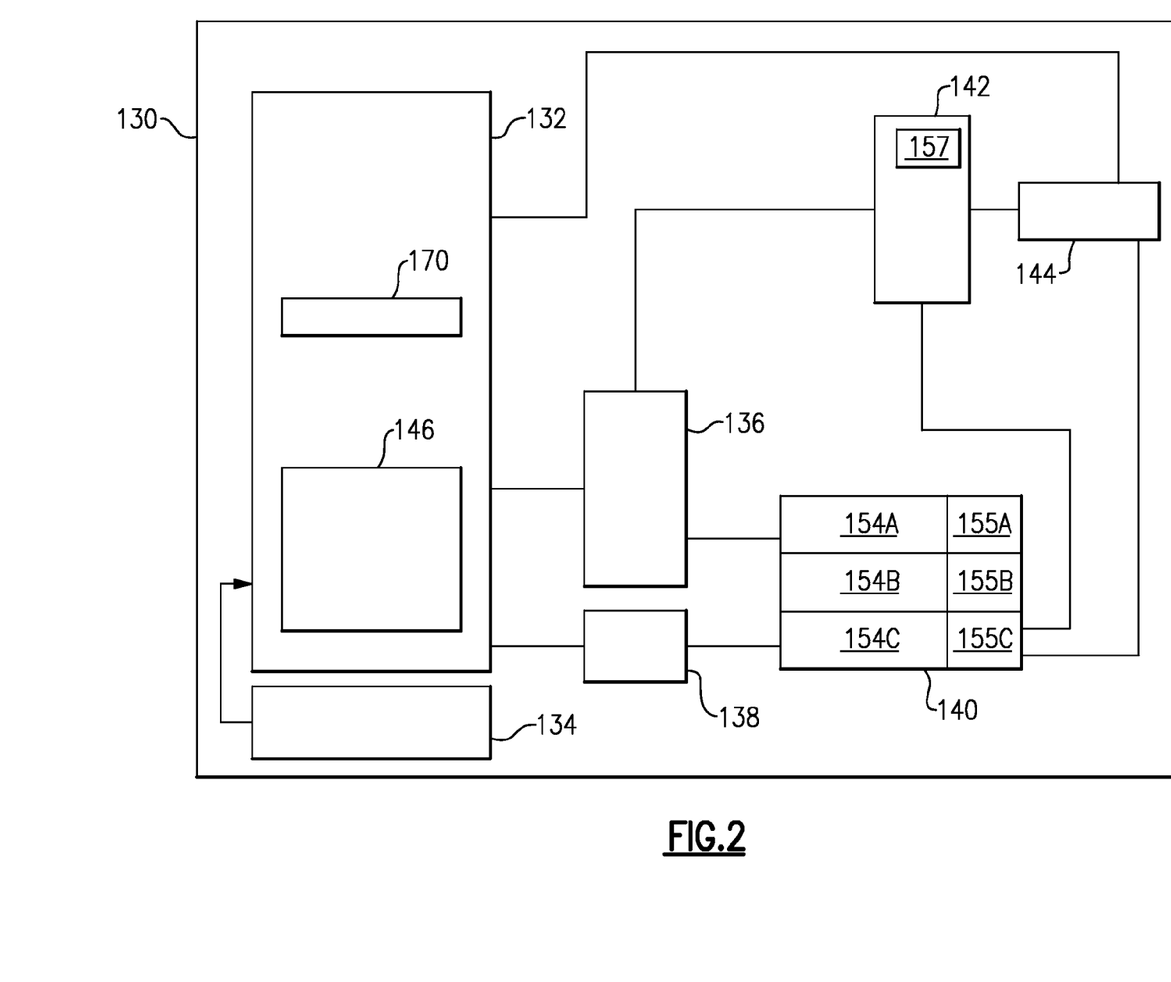
FIG. 2 schematically shows an example control system.

Referring to FIG. 2, the example control system 130, shown schematically, includes a microprocessor 132, an Read Only Memory (ROM) 134, a data bus 136, an address bus 138, a parity protected random access memory (PPRAM) 140, a parity generator 142, and a parity checker 144. The microprocessor 132 includes a memory management unit (MMU) 146 and cache 170. The ROM 134 is in communication with the microprocessor 132 such that the microprocessor 132 moves the compressed static data from ROM 134 into PPRAM 140 as multiple copies 154A-154C of bytes of static data. Static data is data that is not deleted or modified once created. The bytes of data received from the ROM 134 are unzipped, or uncompressed, and written into the PPRAM 140 by the microprocessor 132 for storage and use by the control system 130, creating static data copies 154A-154C as will be described in further detail below. The microprocessor 132 writes the static data copies 154A-154C to the PPRAM 140 through data bus 136 while retaining and assigning the address of the static data copies 154A-154C stored in the PPRAM 140 through address bus 138. The static data copies 154A-154C are utilized when the first static data copy is determined to be corrupted. Due to memory size constraints and SEU protection requirements, static data copies 154A-154C are stored on the PPRAM 140 for access, as opposed to the ROM 134 so that corrupted static data copies 154A-154C can be overwritten and corrected.

The data bus 136 is configured to allow the microprocessor 132 to write data to the PPRAM 140 and read data from PPRAM 140. When the data bus 136 is writing static data copies 154A-154C, the data is being sent to and stored in the PPRAM 140. When the microprocessor 132 reads data through the data bus 136, the stored data copies 154A-154C in the PPRAM 140 are being accessed for use by the control system 130. The MMU 146 maps each of static data copy 154A-154C address locations at startup. The cache 170 is disabled at startup for the static data copies 154A-154C. The address bus 138 contains the requested address location of the microprocessor 132 program to access a given memory location in the PPRAM 140. The microprocessor 132 is able to access multiple static data copies 154A-154C stored in the PPRAM 140 by using the MMU 146 to point to the address of a particular static data copy 154A-154C and reading the static data copy 154A-154C using the data bus 136.

When the data bus 136 operates to either write data or read data for the microprocessor 132, the static data copy 154A-154C being written or read is also sent to the parity generator 142. The parity generator 142 takes each static data copy 154A-154C and creates a parity bit 155A-155C for each byte. Alternatively, parity may be determined on a different number of bits, such 4, 16, 32, 64, or other numbers of bits. The parity bit 155A-155C will be either a one or a zero, depending on whether odd parity checking or even parity checking is being employed, and will be stored in the PPRAM 140 with the corresponding static data copy 154A-154C.

In one example, the control system 130 employs odd parity checking, as shown by example in Table 1 below. In this example, the parity generator 142 will count the number of ones in each byte of data and determine the parity bit 155A-155C to be created and added to each byte such that the nine bits will have an odd number of ones. If there is an even number of bits with the value 1, the parity bit 155A-155C will be assigned the value 1 and if there are an odd number of bits with the value 1, the parity bit 155A-155C will assigned a value 0.

TABLE 1

| Sample Data Bits in a Byte | Number of Ones in Data Byte | Parity Bit | Number of Ones Including Parity Bit |
|---|---|---|---|
| 00000000 | 0 | 1 | 1 |
| 10110011 | 5 | 0 | 5 |
| 10010100 | 3 | 0 | 3 |
| 11111111 | 8 | 1 | 9 |

In another example, the control system 130 employs even parity checking, as shown by example in Table 2. In this example, the parity generator 142 will generate a parity bit 155A-155C such that the number of ones in the byte will always be even. If there is an even number of bits with the value 1, the parity bit 155A-155C is assigned the value of 0 and if there are an odd number of bits with the value 1, the parity bit 155A-155C will assigned a value of 1. After the parity generator 142 has created the correct parity bit 155A-155C, the parity bit 155A-155C is sent to the PPRAM 140 to be added and stored with the corresponding static data copy 154A-154C it was generated from.

TABLE 2

| Sample Data Bits in a Byte | Number of Ones in Data Byte | Parity Bit | Number of Ones Including Parity Bit |
|---|---|---|---|
| 00000000 | 0 | 0 | 0 |
| 10110011 | 5 | 1 | 6 |
| 10010100 | 3 | 1 | 4 |
| 11111111 | 8 | 0 | 8 |

Although Tables 1 and 2 show example parity bits 155A-155C assigned for data bits in example data bytes, any data bytes and corresponding parity bits 155A-155C can be used.

Each time the microprocessor 132 reads static data copies 154A-154C through the data bus 136, the static data copy 154A-154C being read is also sent to the parity generator 142. The parity generator 142 will create a new parity bit 157 for the static data copy 154A-154C being read. The parity generator 142 sends this new parity bit 157 to the parity checker 144. At the same time, the PPRAM 140 sends the parity bit 155A-155C stored for the same static data copy 154A-154C being read to the parity checker 144. The control system 130 is able to compare the original parity bit 155A-155C with the new parity bit 157.

The parity checker 144 will compare the two parity bits 155A-155C, 157 to determine if they match. If a bit changes from a zero to a one or a one to a zero, the parity bit 157 which is output by the parity generator 142 will also change. If the parity checker 144 determines that the parity bits 155A-155C, 157 do not match, then a bit in the static data copy 154A-154C has changed and the static data copy 154A-154C has a parity fault indicating an error. The control system 130 could suffer an SEU by using a static data copy 154A-154C having a parity fault. When the comparison of parity bits 155A-155C, 157 indicates that a fault has occurred, the parity checker 144 signals the microprocessor 132 that a fault has occurred.

In this example, only the PPRAM 140 is subject to having static data copies 154A-154C suffer a bit value change that can cause SEU. The ROM 134 does not need to be protected from a bit value change because the ROM 134 cannot be overwritten. Because the software run within control system 130 requires more memory than can be offered by the ROM 134, the PPRAM 140 is used to store static data copies 154A-154C during software execution. By employing the parity bit checking, the control system 130 is able to detect any errors created in the static data copies 154A-154C which could cause an SEU.

In the example control system 130, the data bus 136 and address bus 138 are both 32-bit busses. However, a larger or smaller data buss 136 and address buss 138 may be used depending on control system 130 requirements.

Figure 3A:
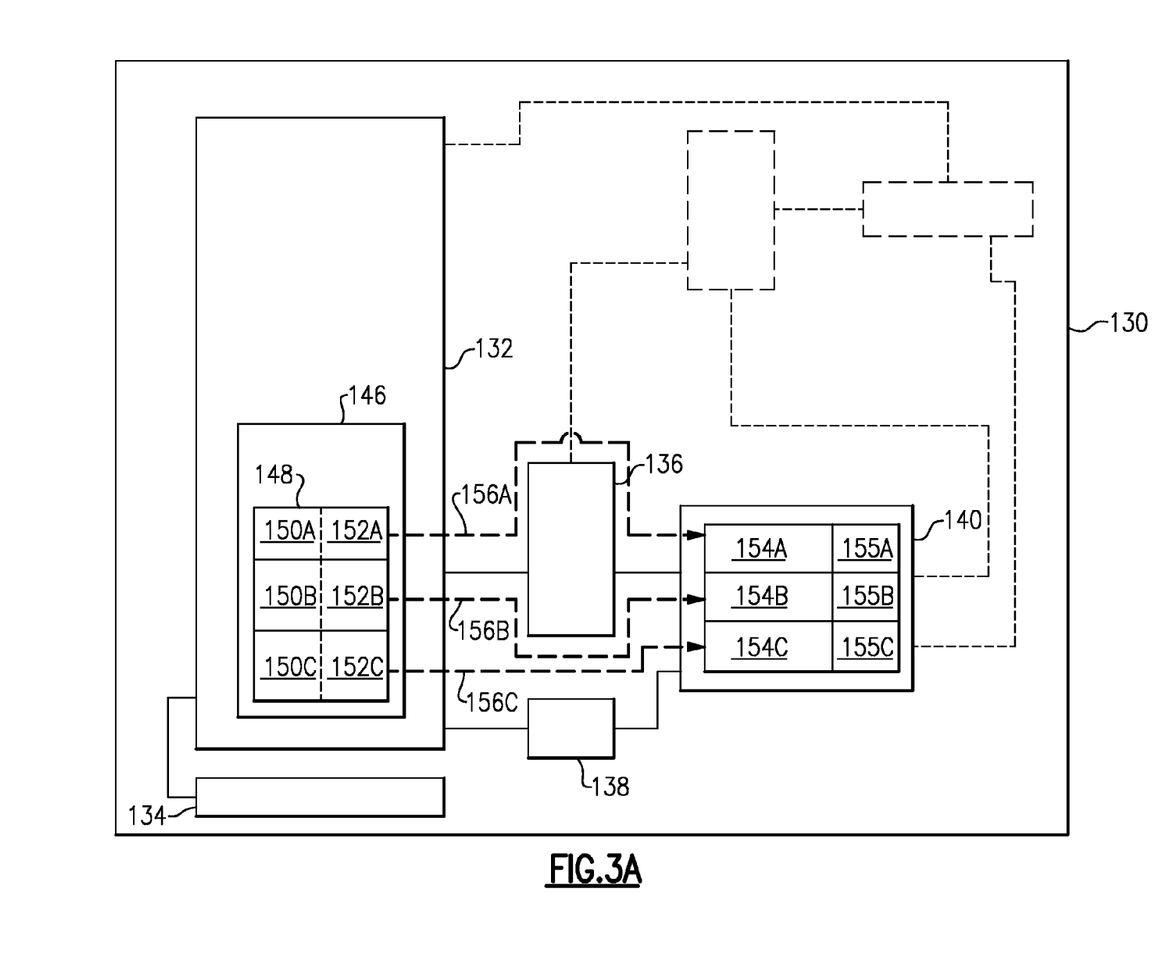
FIG. 3A schematically shows portions of the control system of FIG. 2 with data mapping.

Referring to FIG. 3A, with continued reference to FIG. 2, when the microprocessor 132 sends the static data copies 154A-154C provided from the ROM 134 to the PPRAM 140, the memory addresses for each static data copies 154A-154C are provided to the MMU 146 by address bus 138. The MMU 146 includes a MMU table 148 having logical pages 150A-150C and physical pages 152A-152C for each static data copy 154A-154C sent to the PPRAM 140. Each logical page 150A-150C includes a logical address which points to a physical page 152A-152C. Each physical page 152A-152C includes a physical address for each copy of static data 154A-154C sent to the PPRAM 140. The logical address for each static data copy 154A-154C is where the static data copies 154A-154C are assumed to reside when the control system 130 is reading the static data copies 154A-154C. The physical address indicates the address where the static data 154A-154C is actually located in the PPRAM 140.

During operation of the control system 130, each static data copy 154A-154C is mapped to a physical address stored in corresponding physical page 152A-152C. The physical address stored in physical page 152A points to corresponding static data copy 154A as indicated by arrow 156A. The physical address stored in physical page 152B points to static data copy 154B. The physical address stored in physical page 152C points to static data copy 154C. Similarly, the logical address stored in each logical pages 150A-150C will point to a corresponding physical address stored in physical pages 152A-152C. Therefore, initially the logical address of logical page 150A will point to the physical address of the physical page 152A, the logical address of logical page 150B will point to the physical address of physical page 152B and the logical address of logical page 150C will point to the physical address of physical page 152C.

In this example, when the microprocessor 132 has the data bus 136 read data, the data bus 136 and address bus 138 will always refer to the logical address in logical page 150A to retrieve the appropriate static data copy 154A-154C. However, the data bus 136 and address bus 138 may also use the logical address stored in logical page 150B or logical page 150C.

In this example, during operation the microprocessor 132, data bus 136, and address bus 138 will always determine the static data copy 154A-154C to use by using the same logical page 150A. Although only three static data copies 154A-154C, with associated logical pages 150A-150C and physical pages 152A-152C are shown, any number of logical pages 150, physical pages 152, and corresponding static data copies 154 are within the contemplation of this disclosure.

Figure 3B:
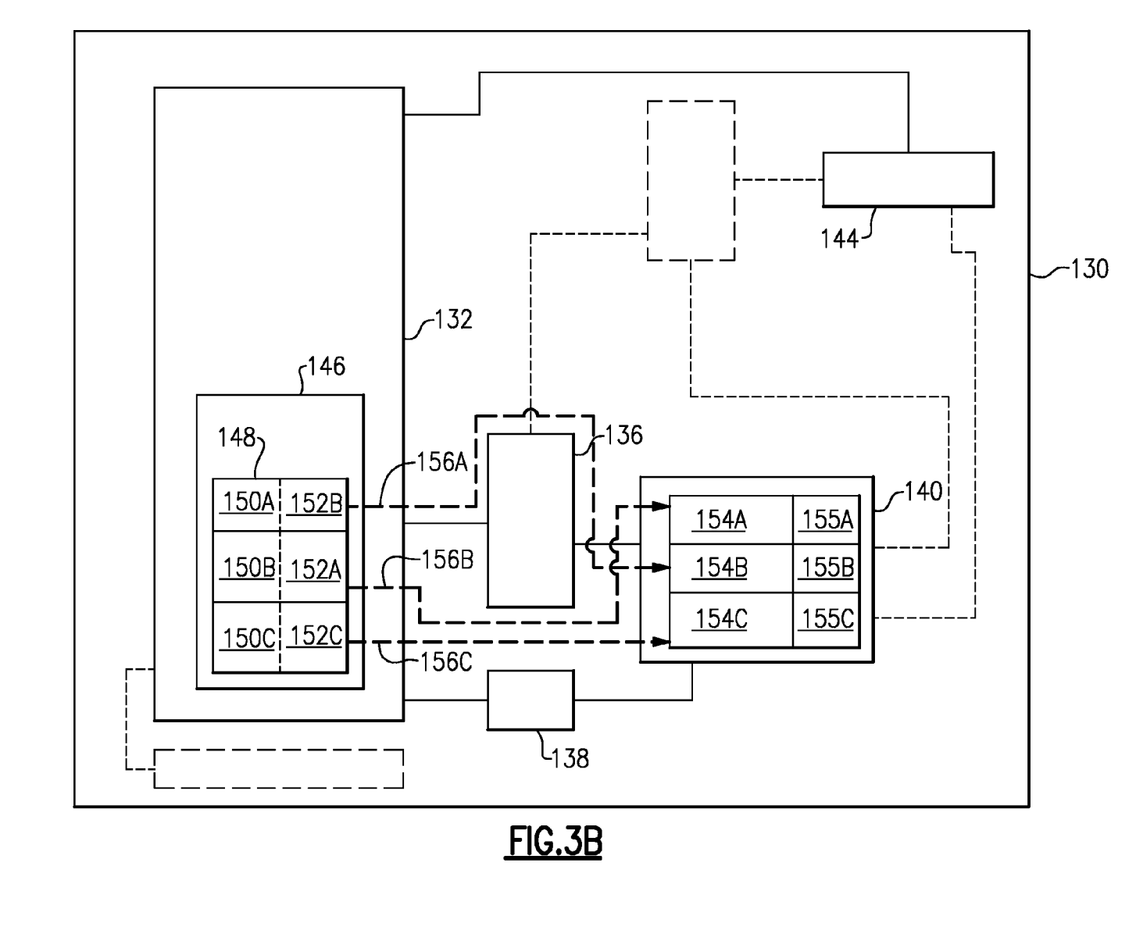
FIG. 3B schematically shows portions of the control system of FIG. 2 with reconfigured data address mapping.

Referring to FIG. 3B, when the parity checker 144 has detected a parity fault in static data copy 154A, it notifies the microprocessor 132. The microprocessor 132 reconfigures the MMU table 148. Logical page 150A, which is being used by the data bus 136 and address bus 138 to determine which static data copy 154A-154C to access, is reconfigured to point to the physical address stored in physical page 152B. The control system 130 thus avoids reliance on the static data copy 154A, which has a parity fault as indicated by the parity checker 144. By reconfiguring logical page 150A, the control system 130 can continue normal operation without any interruption, such as rebooting the control system 130.

As a result of the MMU table 148 reconfiguration, logical page 150B will now point to the physical address stored in physical page 152A and logical page 150C will point to the physical address stored in physical page 152C. However, the physical address stored in physical pages 152A-152C does not change. Therefore, the MMU 146 is able to point to a different copy of static data 154A-154C that does not have an error.

Figure 3C:
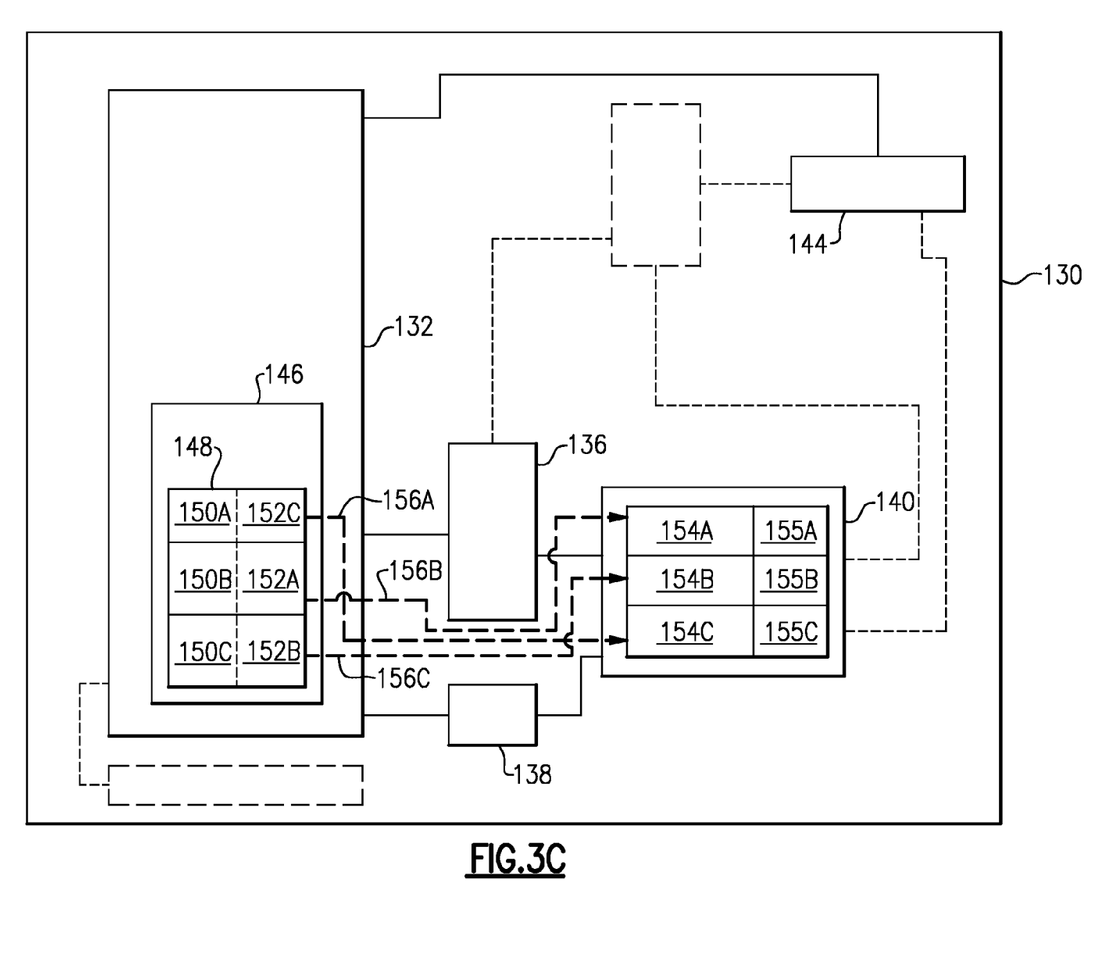
FIG. 3C schematically shows the control system of FIG. 2 with another reconfigured data address mapping.

Referring to FIG. 3C, when the parity checker 144 has detected a parity fault in static data copy 154B, it notifies the microprocessor 132. The microprocessor 132 reconfigures the MMU table 148. Logical page 150A, which is being used by the data bus 136 and address bus 138 to determine which static data copy 154A-154C to access, is reconfigured to point to the physical address stored in physical page 152C. The control system 130 thus avoids reliance on the static data copy 154B, which has a parity fault as indicated by the parity checker 144. By reconfiguring logical page 150A, the control system 130 can continue normal operation without interruption.

As a result of the MMU table 148 reconfiguration, logical page 150B will now point to the physical address stored in physical page 152B and logical page 150C will point to the physical address stored in physical page 152A. However, the physical address stored in physical pages 152A-152C does not change. Therefore, the MMU 146 is able to point to a different copy of static data 154A-154C that does not have an error.

In this example, if the final physical page 152C is reached and the parity checker 144 detects a parity fault in static data copy 154C, wrap around will occur. When this parity fault is detected, the logical page 150A will wrap around to again point to physical address stored in physical page 152A, as shown in FIG. 3A. Therefore, the software being run in the control system 130 is never interrupted.

Figure 4:
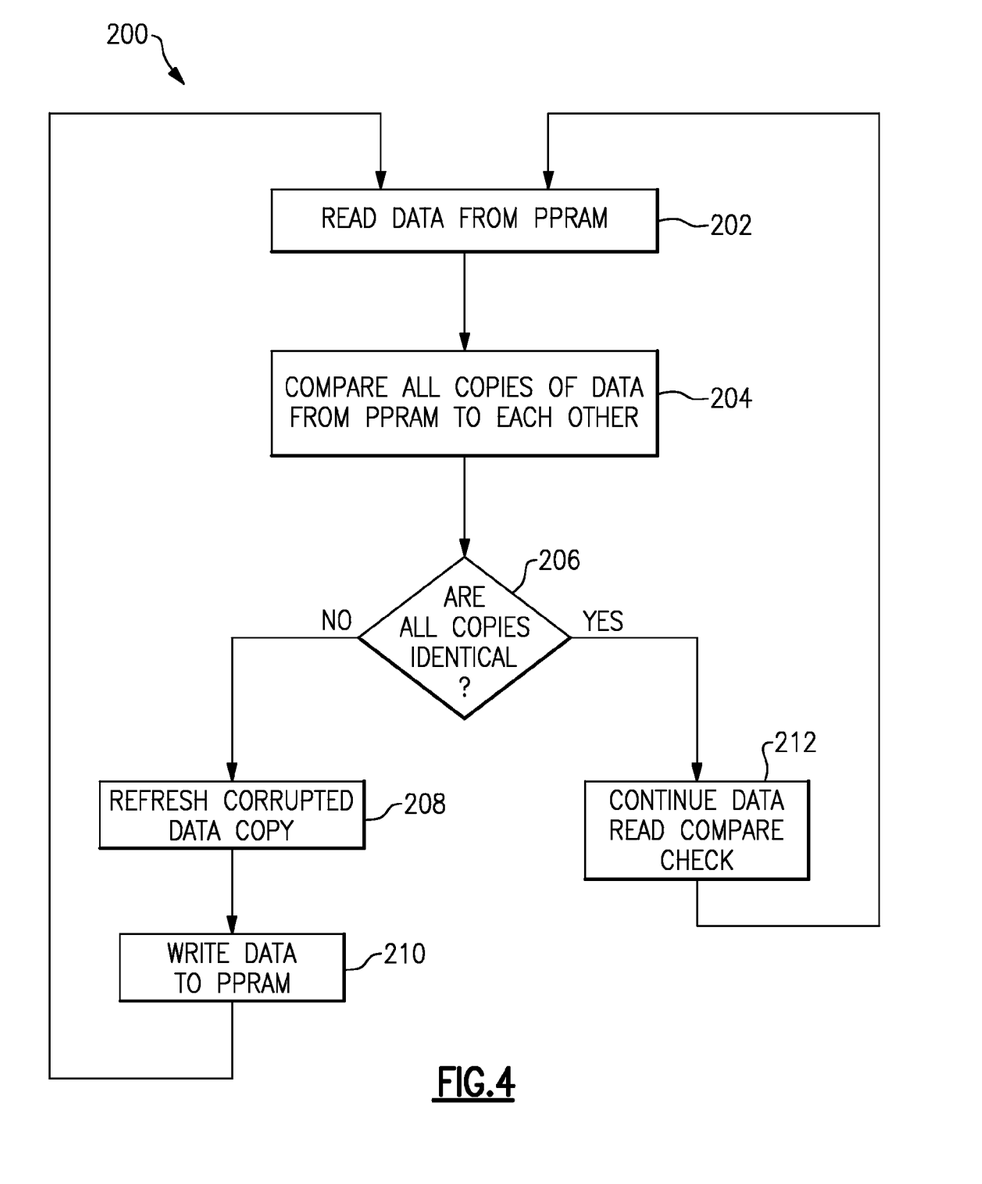
FIG. 4 is a flow chart of an overwrite task of the control system.

Referring to FIG. 4, with continued reference to FIG. 2, corrupted static data copies 154A-154C, which are static data copies 154A-154C suffering from an error due to bit value change, need to be corrected due to the wrap around reconfiguration which the MMU 146 employs due to parity faults. When a parity fault is detected on a static data copy 154A-154C, that static data copy 154A-154C is overwritten with the correct copy of the static data. Microprocessor 132 conducts an overwrite task, shown by flow chart 200, to check, overwrite and replace corrupted static data copies 154A-154C. The overwrite task may be performed as a background process when the microprocessor 132 is not otherwise occupied with a more time or event sensitive foreground process. Repair of corrupted data can be delayed since one or more non-corrupted and uncompressed copies of the data are readily available in the PPRAM 140. The overwrite task is conducted by the microprocessor 132, both when the microprocessor 132 is notified of a parity fault as well as when the microprocessor 132 is not notified of a parity fault. The control system 130 can thus correct any errors in the static data copies 154A-154C that occur during use of a particular static data copy 154A-154C, as well as correct any errors in a static data copy 154A-154C before that static data copy 154A-154C is used by the control system 130.

During operation, the overwrite task will read data from the PPRAM 140 (Step 202). The overwrite task compares each static data copy 154A-154C from the PPRAM 140 to each other to check whether any static data copy 154A-154C does not match and is therefore corrupted (Step 204). If all static data copies 154A-154C are identical (Step 206) the overwrite task will continue comparing data during data read (212), and restart the checking process. (Step 202). If all static data copies 154A-154C are not identical (Step 206), the overwrite task will refresh the corrupted static data copy 154A-154C (Step 208) by overwriting the corrupted static data copy 154A-154C with a correct static data copy 154A-154C. The overwrite task will then continue the checking process (202).

In one example, the overwrite task refreshes the corrupted static data copy 154A by overwriting with data from one of the uncorrupted static data copies 154B,154C. Alternatively, the microprocessor 132 can request a fresh static data copy 154A-154C from the ROM 134 to overwrite the corrupted data static data copy 154A. After the corrupted data copy 154A is overwritten, the static data copies 154A-154C are written back into the PPRAM 140 (Step 210).

Although described using an example corrupted static data copy 154A, the overwrite task is applied to any static data copy 154A-154C which becomes corrupted.

In operation, the ROM 134 provides the static data copies 154A-154C to the microprocessor 132 which unzips or decompresses the copies and writes them into the PPRAM 140. The parity generator 142 assigns each static data copy 154A-154C a parity bit 155A-155C. When data is read from the PPRAM 140 by the microprocessor 132, the stored parity bit 155A-155C in the PPRAM 140 and the parity bit 157 generated from the read static data copy 154A-154C are compared by the parity checker 144. If a parity fault is detected, the parity checker 144 notifies the microprocessor 132, which instructs the MMU 146 to switch the static data copy 154A-154C that is being used. During operation, the microprocessor 132 also runs the overwrite task to continually refresh the static data copies 154A-154C. In this way, the control system 130 is able to detect a bit change which could cause an SEU before the static data copy 154A-154C is being used, as well as after a parity fault is identified, but without interrupting control system 130 operations and software execution.

Although example embodiments have been disclosed, a worker of ordinary skill in this art would recognize that certain modifications would come within the scope of the claims. For that reason, the following claims should be studied to determine the true scope and content.

What is claimed is:

1. A method for uninterrupted execution of control software in an aircraft control system comprising:
   creating a plurality of static data copies each having identical bits of data;
   determining a first parity bit for each of the plurality of static data copies;
   generating the first parity bit using a parity generator to employ odd parity, wherein the first parity bit is configured to be set such that each byte of a static data copy will include an odd number of bits having the value 1;
   determining a second parity bit for a first static data copy;
   detecting a parity fault in the first static data copy if the first parity bit does not match the second parity bit; and
   switching to read a second static data copy in response to detecting a parity fault in the first static data copy.

2. The method of claim 1, further including writing each static data copy into a random access memory (RAM) in conjunction with determining the first parity bit and reading the first static data copy in conjunction with determining the second parity bit.

3. The method of claim 2, further including mapping a memory management unit (MMU) table of a processor, the MMU table including a logical page having a logical address mapped to a physical page having a physical address mapped to a corresponding static data copy address on the RAM for each of the plurality of static data copies.

4. The method of claim 3, wherein the processor reads the first static data copy by accessing only a first logical page having a first logical address, wherein the first logical address initially points to a first physical page with a first physical address mapped to a first static data copy address on the RAM.

5. The method of claim 2, including comparing the plurality of static data copies stored in the RAM to each other to determine a corrupted static data copy responsive to at least one bit not matching a corresponding bit in the remaining plurality of static data copies.

6. The method of claim 5, further comprising the step of overwriting the corrupted static data copy with a new static data copy from a read only memory.

7. The method of claim 1, wherein the first parity bit for each of the plurality of static data copies and the second parity bit for the first static data copy are each determined on only 4 bytes of the corresponding static data copy.

8. The method of claim 1, wherein the plurality of static data copies comprises three static data copies.

9. A method for uninterrupted execution of control software in an aircraft control system comprising:
   creating a plurality of static data copies;
   determining a first parity bit for each of the plurality of static data copies;
   determining a second parity bit for a first static data copy;
   writing each static data copy into a random access memory (RAM) in conjunction with determining the first parity bit and reading the first static data copy in conjunction with determining the second parity bit;
   mapping a memory management unit (MMU) table of a processor, the MMU table including a logical page having a logical address mapped to a physical page having a physical address mapped to a corresponding static data copy address on the RAM for each of the plurality of static data copies, wherein the processor reads the first static data copy by accessing only a first logical page having a first logical address, wherein the first logical address initially points to a first physical page with a first physical address mapped to a first static data copy address on the RAM;
   detecting a parity fault in the first static data copy if the first parity bit does not match the second parity bit; and
   switching to read a second static data copy in response to detecting a parity fault in the first static data copy and reconfiguring each physical address in the MMU table such that the first logical page has a first logical address pointing to a second physical page with a second physical address mapped to a second static data copy location on the RAM.

10. A method for uninterrupted execution of control software in an aircraft control system comprising:
    creating a plurality of static data copies;
    determining a first parity bit for each of the plurality of static data copies;
    determining a second parity bit for a first static data copy;
    writing each static data copy into a random access memory (RAM) in conjunction with determining the first parity bit and reading the first static data copy in conjunction with determining the second parity bit;
    mapping a memory management unit (MMU) table of a processor, the MMU table including a logical page having a logical address mapped to a physical page having a physical address mapped to a corresponding static data copy address on the RAM for each of the plurality of static data copies, wherein the processor reads the first static data copy by accessing only a first logical page having a first logical address, wherein the first logical address initially points to a first physical page with a first physical address mapped to a first static data copy address on the RAM;
    detecting a parity fault in the first static data copy if the first parity bit does not match the second parity bit; and
    switching to read a second static data copy in response to detecting a parity fault in the first static data copy, wherein the step of switching to read a second static data copy in response to detecting a parity fault in the first static data copy is repeated until the first logical address of the first logical page again points to the first physical page.

11. A method for uninterrupted execution of control software in an aircraft control system comprising:
    creating a plurality of static data copies;
    determining a first parity bit for each of the plurality of static data copies;
    determining a second parity bit for a first static data copy;
    writing each static data copy into a random access memory (RAM) in conjunction with determining the first parity bit and reading the first static data copy in conjunction with determining the second parity bit;
    detecting a parity fault in the first static data copy if the first parity bit does not match the second parity bit;
    switching to read a second static data copy in response to detecting a parity fault in the first static data copy; and
    overwriting a corrupted static data copy with another of the plurality of static data copies.

12. A method of data fault correction in a control system during operation in an aircraft comprising:
    reading a plurality of static data copies from a random access memory (RAM), each of the plurality of static data copies having identical bits of data;
    comparing each of the plurality of static data copies to each other;
    determining a corrupted static data copy having a parity fault indicating that at least one bit does not match a corresponding bit in the remaining static data copies amongst the plurality of static data copies;

overwriting the corrupted static data copy with a second data copy to remove the parity fault; and writing each of the plurality of static data copies into the RAM.

13. The method of claim 12, wherein the step of reading the plurality of static data copies from the RAM is performed in response to detection of the parity fault in the control system.

14. The method of claim 12, wherein the step of reading the plurality of static data copies from the RAM is performed prior to detection of the parity fault.

15. The method of claim 12, wherein the step of overwriting the corrupted static data copy occurs while the control system continues operations relying on an uncorrupted static data copy.

16. A method of data fault correction in a control system during operation in an aircraft comprising:

reading a plurality of static data copies from a random access memory (RAM);

comparing each of the plurality of static data copies to each other;

determining a corrupted static data copy having a parity fault indicating that at least one bit does not match a corresponding bit in the remaining static data copies amongst the plurality of static data copies;

overwriting the corrupted static data copy with a second data copy to remove the parity fault, wherein the second data copy is one of the plurality of static data copies that is not corrupted; and writing each of the plurality of static data copies into the RAM.

17. An aircraft control system for continual execution of control software during fault detection comprising:

a random access memory (RAM) configured to store a plurality of static data copies each having identical bits of data;

a processor configured to access a current static data copy for use during operation;

a parity generator configured to generate a first parity bit for each of the plurality of static data copies when the processor writes data to the RAM, wherein the first parity bit is sent to the RAM for storage with the corresponding static data copy, the parity generator configured to generate a second parity bit for each of the plurality of static data copies when each of the plurality of static data copy is read by the processor; and a parity checker configured to compare the first parity bit and the second parity bit for each static data copy being read, the parity checker configured to notify the processor when the first bit and second bit are not matching indicating a parity fault, wherein the processor is reconfigured to access a new static data copy from the plurality of static data copies in response to the parity fault.

18. The aircraft control system of claim 17, wherein the processor comprises a memory management unit (MMU) including an MMU table having a mapped logical page and a mapped physical page for each of the plurality of static data copies, wherein the logical page is configured to store a logical address pointing to a physical page storing a physical address for each of the plurality of static data copies, wherein a first logical page pointing to a first physical page is configured to be used by the processor to access the current static data copy, wherein each of the plurality of static data copies is stored at a corresponding physical address in the RAM.

19. The aircraft control system of claim 17, wherein the plurality of static data copies are configured to be generated by a read only memory and provided to the RAM via the processor.

20. The aircraft control system of claim 17, further comprising a data bus configured to read and write data between the processor and the RAM and an address bus configured to map the physical address of each static data copy in the RAM to the physical address in the corresponding physical page.

21. The aircraft control system of claim 20, wherein the data bus is a 32-bit data bus and the address bus is a 32-bit address bus.

22. The aircraft control system of claim 17, wherein the processor is reconfigured to access the new static data copy from the plurality of static data copies without modifying the new static data copy in response to the parity fault.

23. An aircraft control system for continual execution of control software during fault detection comprising:

a random access memory (RAM) configured to store a plurality of static data copies;

a processor configured to access a current static data copy for use during operation;

a parity generator configured to generate a first parity bit for each of the plurality of static data copies when the processor writes data to the RAM, wherein the first parity bit is sent to the RAM for storage with the corresponding static data copy, the parity generator configured to generate a second parity bit for each of the plurality of static data copies when each of the plurality of static data copy is read by the processor; and a parity checker configured to compare the first parity bit and the second parity bit for each static data copy being read, the parity checker configured to notify the processor when the first bit and second bit are not matching indicating a parity fault, wherein the processor is reconfigured to access a new static data copy from the plurality of static data copies in response to the parity fault, wherein the processor comprises a memory management unit (MMU) including an MMU table having a mapped logical page and a mapped physical page for each of the plurality of static data copies, wherein the logical page is configured to store a logical address pointing to a physical page storing a physical address for each of the plurality of static data copies, wherein a first logical page pointing to a first physical page is configured to be used by the processor to access the current static data copy, wherein each of the plurality of static data copies is stored at a corresponding physical address in the RAM, wherein the physical pages in the MMU table are reconfigured such that the first logical page points to a second physical page having a physical address mapped to a different static data copy than the first physical page in response to the parity fault.

* * * * *